US011235665B2

(12) United States Patent
Mendez Pineda et al.

(10) Patent No.: US 11,235,665 B2
(45) Date of Patent: Feb. 1, 2022

(54) REGENERATIVE BRAKING CONTROL SYSTEM

(71) Applicant: Ford Global Technologies, LLC, Dearborn, MI (US)

(72) Inventors: Herbert David Mendez Pineda, Mexico City (MX); David Ostrowski, Northville, MI (US); Mohan John, Dearborn, MI (US); Victoria Leigh Schein, Dearborn, MI (US); William G. Herbert, Bloomfield Hills, MI (US); Madeleine Itzel Santiago Estrada, Cuautitlán Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 451 days.

(21) Appl. No.: 16/365,162

(22) Filed: Mar. 26, 2019

(65) Prior Publication Data
US 2020/0307384 A1    Oct. 1, 2020

(51) Int. Cl.
| B60L 7/18 | (2006.01) |
| B60L 50/60 | (2019.01) |
| B60L 58/10 | (2019.01) |
| G06N 3/08 | (2006.01) |
| G06N 3/02 | (2006.01) |

(52) U.S. Cl.
CPC .............. B60L 7/18 (2013.01); B60L 50/60 (2019.02); B60L 58/10 (2019.02); G06N 3/02 (2013.01); G06N 3/08 (2013.01); B60L 2240/60 (2013.01); B60L 2240/64 (2013.01); B60L 2250/18 (2013.01); B60L 2260/48 (2013.01)

(58) Field of Classification Search
CPC .............. B60L 7/18; G06N 3/08; G06N 3/02
USPC ........................................................ 701/22
See application file for complete search history.

(56) References Cited

U.S. PATENT DOCUMENTS

| 10,696,165 | B2 * | 6/2020 | Bennett | B60L 58/12 |
| 2003/0006076 | A1 * | 1/2003 | Tamor | B60K 6/48 180/65.25 |
| 2010/0030447 | A1 * | 2/2010 | Smyth | B60W 30/188 701/102 |
| 2011/0066308 | A1 * | 3/2011 | Yang | B60W 10/06 701/22 |
| 2011/0246010 | A1 * | 10/2011 | de la Torre Bueno | B60L 1/08 701/22 |
| 2012/0316712 | A1 * | 12/2012 | Simonini | B60L 58/24 701/22 |
| 2014/0114514 | A1 * | 4/2014 | Crombez | B60W 20/13 701/22 |
| 2016/0061610 | A1 * | 3/2016 | Meyer | G01C 21/26 701/22 |
| 2016/0311423 | A1 * | 10/2016 | Storm | B60W 20/12 |

(Continued)

*Primary Examiner* — Charles A Fox
*Assistant Examiner* — Michael E Butler
(74) *Attorney, Agent, or Firm* — David B Kelley; Brooks Kushman P.C.

(57) ABSTRACT

A vehicle includes an electric machine and a controller. The electric machine is configured to draw energy from a battery to propel the vehicle and to recharge the battery during regenerative braking. The controller is programmed to, in response to identifying a regenerative braking opportunity along an upcoming road segment based on a classification of driver behavior and a classification of the upcoming road segment, operate the electric machine to recharge the battery along the upcoming road segment.

17 Claims, 3 Drawing Sheets

(56) References Cited

U.S. PATENT DOCUMENTS

2019/0180502 A1\* 6/2019 Englard ............... G06T 3/4007
2019/0248358 A1\* 8/2019 Miller ..................... B60K 6/46
2019/0248359 A1\* 8/2019 Miller ..................... B60K 6/46
2019/0351899 A1\* 11/2019 Adam .................... G08G 1/166

\* cited by examiner

REGENERATIVE BRAKING CONTROL SYSTEM

TECHNICAL FIELD

The present disclosure relates to hybrid/electric vehicles and methods of controlling regenerative braking in hybrid/electric vehicles.

BACKGROUND

Regenerative braking is a feature of hybrid vehicles that improves fuel economy by recapturing kinetic energy when the vehicle slows down during a braking event. During regenerative braking, an electric machine may operate as a generator to convert the kinetic energy of the vehicle into electrical energy which is in turn used to charge a battery.

SUMMARY

A vehicle includes an electric machine and a controller. The electric machine is configured to draw energy from a battery to propel the vehicle and to recharge the battery during regenerative braking. The controller is programmed to, in response to identifying a regenerative braking opportunity along an upcoming road segment based on a classification of driver behavior and a classification of the upcoming road segment, operate the electric machine to recharge the battery along the upcoming road segment.

A vehicle battery recharging method includes collecting driver behavior and road segment characteristic data from multiple drivers over multiple segments, establishing a current driver behavior classification based on the driver behavior data, establishing an upcoming road segment classification based on the road segment characteristic data, identifying a regenerative braking opportunity along the upcoming road segment by cross-referencing the driver behavior classification to the upcoming road segment classification, and recharging the battery via regenerative braking along the upcoming road segment.

A vehicle includes an electric machine and a controller. The electric machine is configured to draw energy from a battery to propel the vehicle and to recharge the battery during regenerative braking. The controller is programmed to, in response to identifying a regenerative braking opportunity along an upcoming road segment based on classifications of driver behavior and the upcoming road segment, schedule a regenerative braking event along the upcoming road segment. The controller is further programed to, in response to a battery charge capacity being less than a value required to recoup an estimated potential regenerative braking energy during the scheduled regenerative braking event, operate the electric machine to increase the battery charge capacity to greater than the value prior to the scheduled regenerative braking event.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
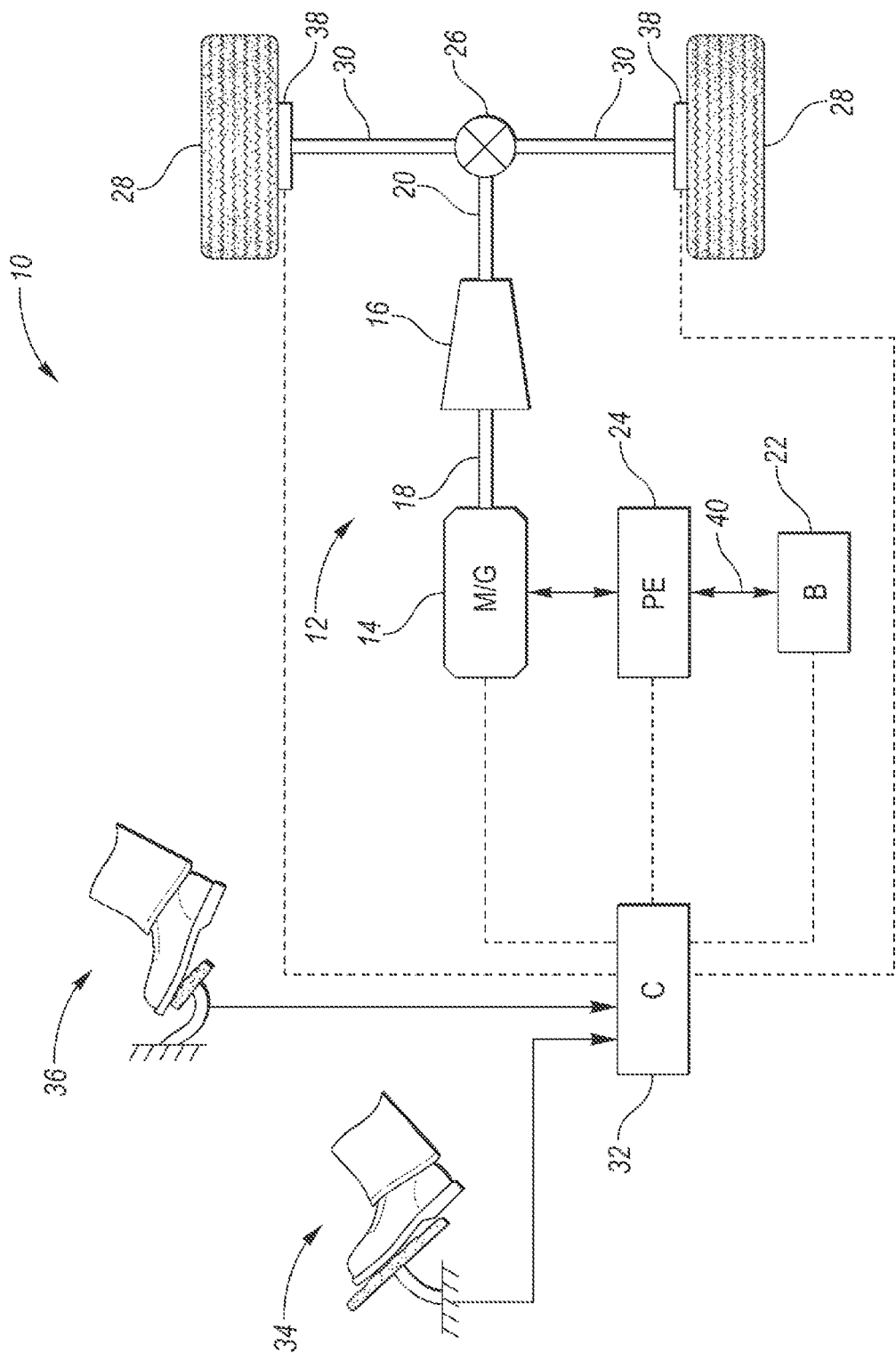
FIG. 1 is a schematic illustration of an exemplary powertrain of an electric vehicle.

Referring to FIG. 1, a schematic diagram of an electric vehicle 10 is illustrated according to an embodiment of the present disclosure. FIG. 1 illustrates representative relationships among various components of the vehicle 10. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16). Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), brake pedal position (BPS), ignition switch position (IGN), ambient air temperature, transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14, the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described in FIG. 1 is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or a natural gas powered engine, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

Figure 2:
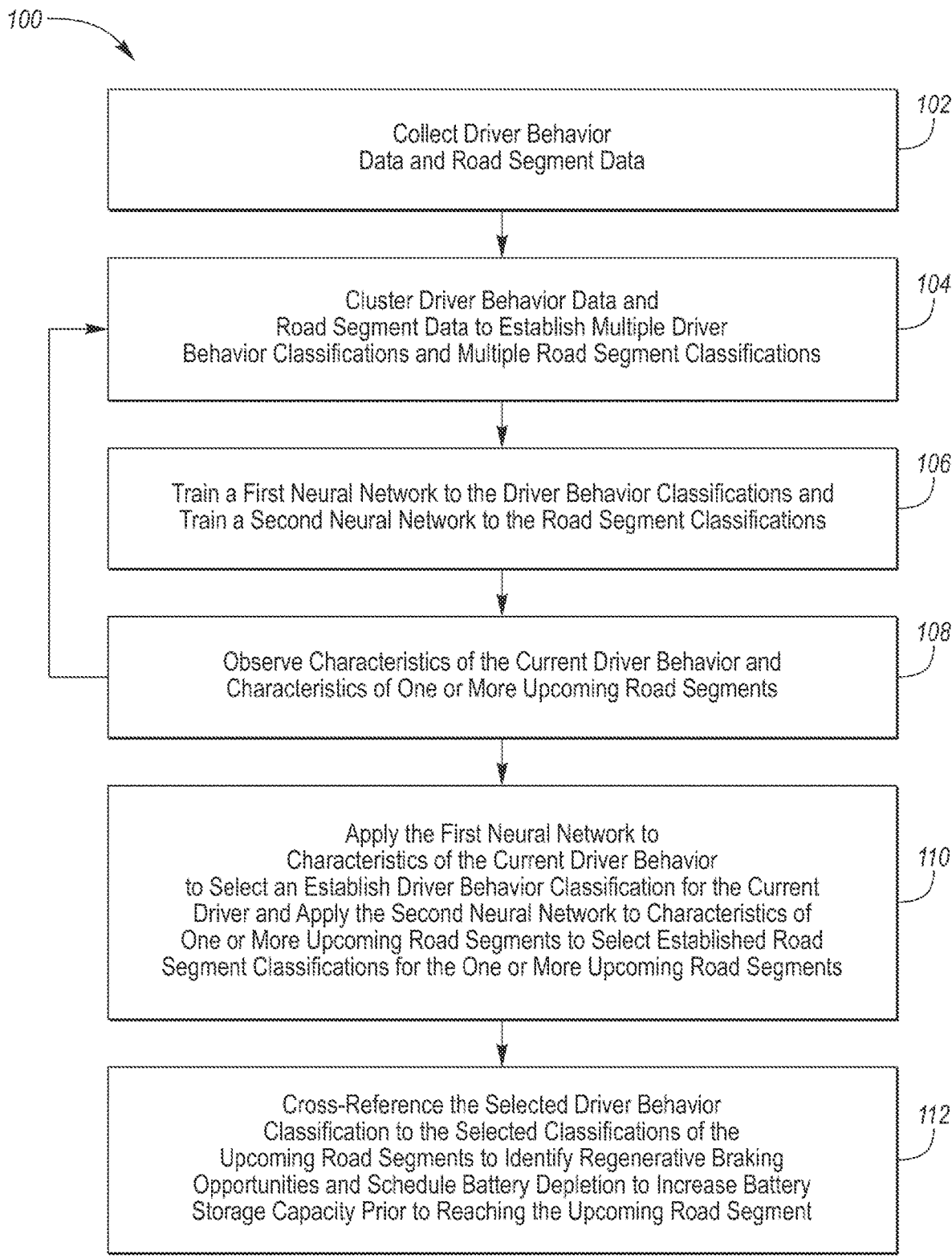
FIG. 2 is a flowchart illustrating a method of optimizing regenerative braking in a hybrid/electric vehicle.

Referring to FIG. 2, a flowchart of a method 100 of optimizing regenerative braking in a hybrid/electric vehicle (e.g., vehicle 10) is illustrated. The method 100 may be stored as control logic and/or an algorithm within the controller 32 and/or on a network that is communication with the controller 32. The controller 32 may be in communication with the network via a cellular tower 57, a WiFi access point, or by any other wireless communication process. As will be appreciated, the wireless communication may facilitate V2X (vehicle to anything) communication. This can include, for example, vehicle to vehicle, vehicle to cloud (i.e., vehicle to network), vehicle to infrastructure, etc. Furthermore, other vehicles may upload data to the network, which may be then downloaded by vehicle 10. The controller 32 may implement the method 100 by controlling the various components of the vehicle 10.

The method 100 begins at block 102 where data is collected from multiple participating drivers during the operation of multiple vehicles. The data is divided into driver behavior data and road segment data. The driver behavior data is further divided into a first peer level and a second peer level. The first peer level of driver behavior data may include vehicle make, vehicle model, the specific powertrain of the vehicle, and the vehicle year. The second peer level of data may include the ratio of city to highway driving, average city driving vehicle speed, average highway driving vehicle speed, standard deviation of city driving vehicle speed, standard deviation of highway driving vehicle speed, average accelerator pedal position, standard deviation of accelerator pedal position, average trip length, standard deviation of trip distance, proximity of trip locations (start, middle, end, etc.), brake score (brake score is a concept introduced in any variant of a Full Hybrid EV, Plug in Hybrid EV or Battery EV. After each time driver requests a vehicle deceleration or a braking event the Vehicle System Controller or VSC makes a calculation of the amount of total energy that can recovered versus the actual energy that was recovered after the event. After the event comes to a completion the score is displayed at the cluster. Those percentages that are not displayed are stored in the VSC. When a drive cycle is completed the overall average percentage is displayed in the cluster), percent of driving time the vehicles operate in an electric only mode (e.g., vehicle 10 operating in an EV mode where the M/G 14 propels the vehicle alone), percent of driving time the vehicles operate in a mode where the electric machines that propel the vehicles are shutdown (e.g., if the vehicles are hybrid vehicles, the percent of time that the engines or power sources propel the vehicles while the electric machines are shutdown), percent of driving time the vehicles operate in a hybrid mode (e.g., if the vehicles are hybrid vehicles, the percent of time the vehicles operate in an eAssist mode where the electric machines and additional power sources, such as engines, operate in unison to propel the vehicle), percent of driving time the vehicles are performing a regenerative braking maneuver, percent of vehicle launches where the electric machines propel the vehicles alone to accelerate the vehicle from a stop (i.e., percent of eLaunches), percent of driving time the vehicles spend coasting (no acceleration), percent of driving time the vehicles spend creeping (driving 5 mph or less), etc.

The driver behavior data may be collected via the controllers of the multiple vehicles (e.g., vehicle controller 32) and then shared over any type of wireless communication as described above. For example, the driver behavior data from multiple drivers may be stored on a central server and then communicated to the controllers of the multiple vehicles over a wireless network.

The road segment data is divided into look-ahead road segment data and experiential road segment data (i.e., how drivers performed on specific road segment types). The road segment look-ahead data includes sign attributes of the road segment (e.g., is there a stop sign, yield, sign, traffic light, etc.), proximity of the road segment to other roads, traffic volume of the road segment, and indicates whether the road segment is in a city or rural area. Road segment look-ahead data also includes average road segment altitude or elevation, average road segment curvature (which is determined from points that define the segment shape along latitude and longitude values), road segment intersections and types (i.e., three-way, four-way, etc.), and indicates whether the road segment is on a highway or on city roads. Finally, road segment look-ahead data includes the speed limit of the road segment, a change in speed limit along the road segment, indicates whether there is a change in road curvature along the road segment, whether the road segment in a residential area, the road segment profile, etc. A road segment profile is a property that has value for any location along a path (e.g., curvature, form of way, number of lanes, speed limit, horizontal geometry, etc.). For example, a road segment profile property may include a freeway exit ramp where "banking" may occur, a single lane road, or a two-lane road, a four-way stop, etc. Banking is a turn or change of direction of a vehicle in which the vehicle banks or inclines, usually towards the inside of the turn.

The experiential road segment data is further divided into vehicle performance road segment data and driver behavior road segment data. The driver performance road segment data includes, regenerative braking realized (as a percent of battery state of charge) over the road segments, regenerative braking not realized (as a percent of battery state of charge) over the road segments, regenerative braking realized or not realized per sub-segment over the road segments (as a percent of battery state of charge), amount of battery charge depleted over road the segments (as a percent of battery state of charge), amount of battery charge depleted per sub-segment over the road segments (as a percent of battery state of charge), etc. The driver behavior road segment data includes average vehicle speed over the road segments, standard deviation of vehicle speed over the road segments, average vehicle torque over the road segment (e.g., at either the powerplants of the vehicle, such as an engine or a motor/generator or at the wheels of the vehicles), standard deviation of vehicle torque over the road segments, average braking torque or vehicle deceleration over the road segments, standard deviation of average braking torque or standard deviation of vehicle deceleration over the road segments, etc.

All of the data is initially recorded to support an initial starting point for the algorithms. A "trip" may be defined as the data collected from "key-on" event (i.e., when a vehicle ignition is on) to a "key-off" event (i.e., when a vehicle ignition is off). During each trip, a road segment may be defined a preset value (e.g., 100 yards) or less in cases where a trip does not round off evenly to the preset value. Each road segment may be further divided into sub-segments (e.g., each road segment may be divided into 10 or more sub-segments). Driver behavior data and road segment data, which may include any of the driver and road segment data listed above, is continually being recorded during each trip. Data specific to road characteristics are supported by the Advanced Driver Assistance Systems Interface Specifications (ADASIS) v2 Protocol. The ADASIS protocol is a consortium defined specification for the transmission of navigational data through the vehicle CAN bus aligned to time. The road segment data may be collected by sensors, cameras, a global positioning system (GPS), and/or may be derived based on information from an electronic horizon program (i.e., a computer program that includes map information of the characteristics of road segments, such as grade or curvature), etc. As road segment data is collect, road segments may be classified to existing categories established by previously recorded data from the current driver and/or other drivers. Through the use of vehicle cameras/sensors and look-ahead navigational data, the classifications of upcoming road segments may be matched to existing classifications before traveling over the upcoming road segments.

The road segment look-ahead data (e.g., data from an electronic horizon program and/or a camera) and the road segment experiential data (how well drivers performed on specific road types) will be utilized for predicting protentional regenerative braking opportunities along upcoming road segments and to schedule any required depletion prior to reaching the upcoming road segments where regenerative braking opportunities have been identified. If the energy storage capacity of the battery is less than the expected energy to be recovered along the upcoming road segments where regenerative braking opportunities have been identified, a depletion will be scheduled to increase the storage capacity to equal or greater than the expected energy to be recovered along the upcoming road segments. For example, if the battery state of charge is 90%, the battery will have a 10% state of charge capacity to receive energy during regenerative braking. If a regenerative braking opportunity has been identified that will increase the battery state of charge by 15%, a battery depletion of at least 5% will be scheduled prior to reaching the upcoming road segment so that the battery state charge is decreased to at most 85% and the storage capacity is increased to at least 15%, so that all of the energy may be recuperated along the upcoming road segment where the regenerative braking opportunity has been identified that will increase the battery state of charge by 15%.

The road segment data may be collected via the controllers of multiple vehicles (e.g., vehicle controller 32) and then shared over any type of wireless communication as described above. For example, the road segment data from multiple drivers may be stored on a central server and communicated to the controllers of the multiple vehicles over a wireless network.

The method 100 next inputs the driver behavior data (including the first and/or second peer level data) and the road segment data (including the look-ahead data and experiential data) from block 102 into block 104. At block 104 a statistical clustering algorithm is applied to the driver behavior data from multiple drivers to establish the multiple driver behavior classifications. The driver classifications may include aggressive drivers, average drivers, casual drivers, etc. Also, at block 104, another a statistical clustering algorithm is applied to the road segment data from multiple drivers to establish the multiple road segment classifications. The statistical clustering algorithms may be a k-means statistical clustering algorithm.

Once the classifications have been established via the k-means statistical clustering algorithms, the method 100 moves on to block 106, where a first neural network is trained to the driver behavior classifications that were established at block 104 and a second neural network is trained to the road segment classifications that were established at block 104. The method 100 then moves on to block 108 where the characteristics of the current driver behavior (i.e., the driving behavior of an individual that is currently operating a vehicle such as vehicle 10) and the characteristics of the one or more upcoming road segments are observed. The characteristics of the current driver behavior may include any of the types of driver behavior data collected at block 102. The characteristics of the one or more upcoming road segments may include any of the types of road segment data collected at block 102. As the driver behavior data and road segment data is continuously observed at block 108 (which may include data observed via multiple drivers), the new data is input into block 104 in order to continuously update and/or refined the established multiple drive behavior classifications and the multiple road segment classifications.

Next, the method 100 moves on to block 110 where the first trained neural network is applied to the characteristics of the current driver behavior to select an established driver behavior classification (i.e., one of the driver behavior classifications established at block 104) for the current driver. Also, at block 110 the second trained neural network is applied to the characteristics of the one or more upcoming road segments to select established road segment classifications (i.e., one or more of the road segment classifications established at block 104) for the one or more upcoming road segments. Next, the method 100 moves on to block 112 where the selected driver behavior classification for the current driver and the selected classifications of the one or more upcoming road segments are cross-referenced to identify regenerative braking opportunities (i.e., where the experiential road segment data has indicated that the drivers in selected driver behavior classification will likely perform a regenerative braking maneuver along the selected road segment classifications of the one or more upcoming road segments) along the upcoming road segments and to schedule a battery energy depletion to increase the battery storage capacity prior reaching the upcoming road segments that have been identified as regenerative braking opportunities. The cross-referenced data (i.e., the cross-referenced data between the driver classifications and the road segment classifications) may be stored as tables within the controller 32 or in a network server that is accessible via wireless communication. Energy depletion may only be required prior to reaching the upcoming road segments that have been identified as regenerative braking opportunities if the battery storage capacity is not sufficient to fully recuperate the amount of available/potential regenerative braking energy that may be recouped along the upcoming road segments that have been identified as regenerative braking opportunities.

Figure 3:
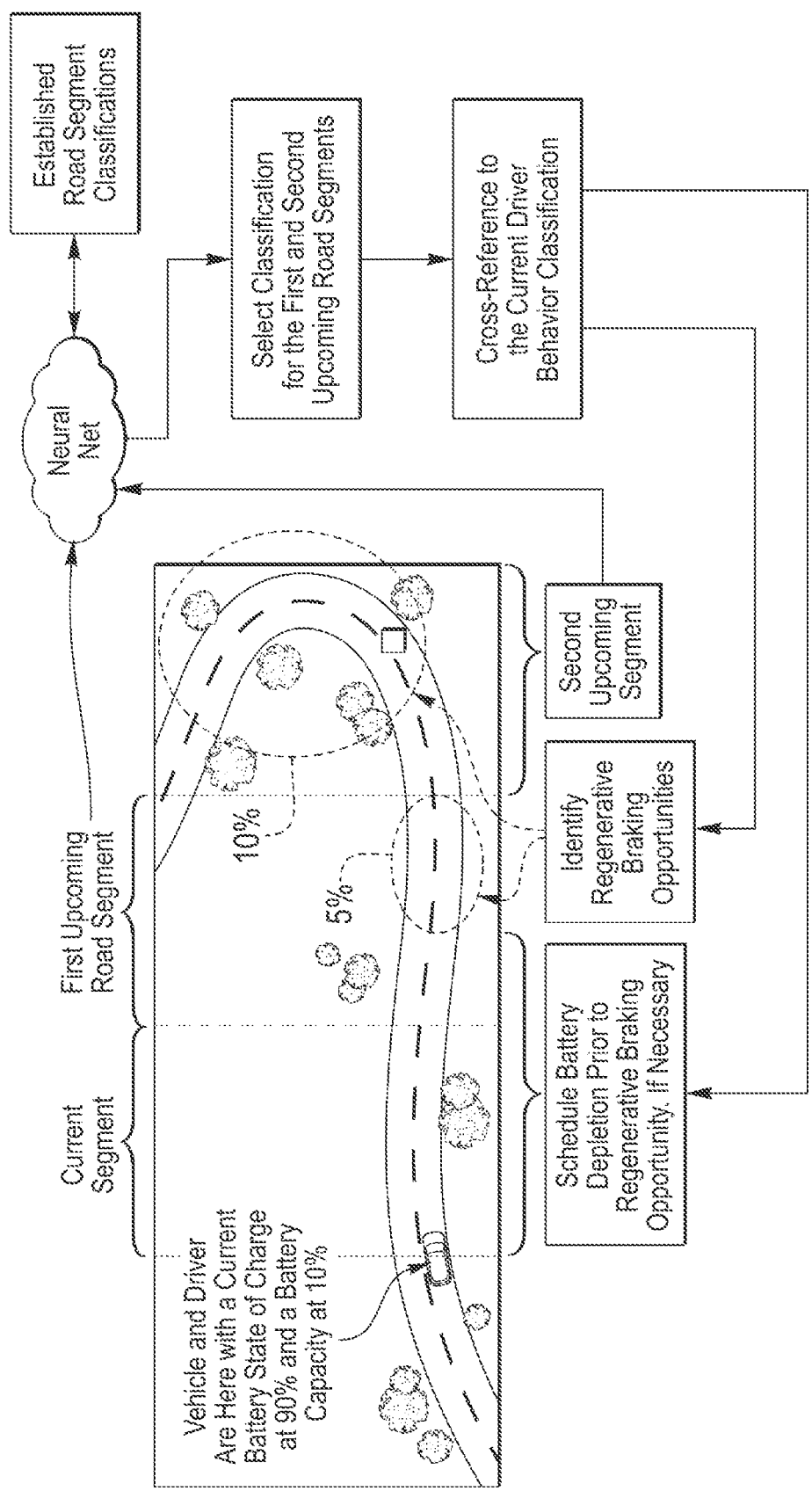
FIG. 3 is an example of predicting a regenerative braking opportunity along one or more upcoming road segments and depleting the battery prior to the regenerative braking opportunity in order to maximize regenerative braking along the upcoming road segments.

Referring to FIG. 3, an example of predicting a regenerative braking opportunity along one or more upcoming road segments and depleting the battery prior to the regenerative braking opportunity in order to maximize regenerative braking along the upcoming road segments is illustrated. In the example, through the use look-ahead data, data from an electronic horizon program, GPS data, and/or sensor/camera data, a first upcoming road segment and a second upcoming road segments are identified. Next, the trained neural network is applied to select classifications from the established road segment classifications for the first and second upcoming road segments. The selected road segment classifications for the first and second upcoming road segments are then cross-referenced to the current driver behavior classification (that was established by applying a neural network to the characteristics of the current driver behavior to select an established driver behavior classification). The cross-referenced data is then applied to identify regenerative braking opportunities along the first and second upcoming road segments and to schedule any required battery depletion prior reaching the upcoming road segments that is required to fully recuperate all of the potential regenerative braking energy that has been identified (according the driver behavior and road segment classifications) along the upcoming road segments.

A nearest neighbor algorithm may be applied to the road segment data to identify the top performing road segments within the road segment classifications (i.e., which road segment within the classifications recuperated the most amount energy during regenerative braking) that match the first and second upcoming segments ahead of the current driver. More specifically, nearest neighbor algorithm may identify top performing road segments within the road segment classifications to estimate the maximum potential regenerative braking energy that may be recuperated along the first and second upcoming road segments.

In the example depicted in FIG. 3, the identified potential regenerative braking energy that may be recuperated along the first upcoming road segment is identified to recharge the battery by 5% and the identified potential regenerative braking energy that may be recuperated along the second upcoming road segment is identified to recharge the battery by 10%. The battery of the vehicle is shown to have a 90% state of charge and a 10% capacity to recharge at the current segment. In order to recuperate the entire 15% along the first and second upcoming road segments, the vehicle controller will schedule a depletion of at least 5% to reduce the battery state of charge to at most 85% and to increase battery storage capacity to at least 15% so that all the potential regenerative braking energy may be recuperated along first and second upcoming road segments. Such depletion may occur by utilizing the M/G 14 to deplete the battery 22, which increases fuel economy and reduces emissions (in hybrid vehicles that incorporate both an electric motor and an internal combustion engine) by increasing the use of the electric machine to propel the vehicle and by maximizing recuperation of potential regenerative braking energy. It should be noted that FIG. 3 is merely an example of how the method 100 operates and that it should be understood that other states of charge, battery recharge capacities, estimated regenerative braking energy that will recharge the battery by specific percentages, etc. may be different than what was depicted in FIG. 3.

The method 100 may also take into account the path probability (i.e., the probability that a driver will take a specific path as opposed to other optional paths). Path probability may play a substantial role in driver behavior/road segment classification for the purpose of maximizing regenerative braking, when it is possible for a driver to take alternative paths. In such a case, the alternative scenarios may be considered when scheduling battery depletion, which may be accomplished by leveraging a weighted average of all of the potential sub-paths. Each path may receive a weighted value that is based on or equal to the probability that a driver will take the given path.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an electric machine configured to draw energy from a battery to propel the vehicle and to recharge the battery during regenerative braking; and
a controller programmed to, in response to identifying a regenerative braking opportunity along an upcoming road segment based on a classification of a current driver behavior and a classification of the upcoming road segment, operate the electric machine to recharge the battery along the upcoming road segment, wherein the classification of the upcoming road segment is selected from one of multiple road segment classifications that were established based on an application of a k-means clustering algorithm to road segment characteristic data from multiple road segments.

2. The vehicle of claim 1, wherein the controller is further programed to, in response to a battery charge capacity being less than a value required to recoup an estimated potential regenerative braking energy along the upcoming road segment, operate the electric machine to increase the battery charge capacity to greater than the value prior to the vehicle reaching the upcoming road segment.

3. The vehicle of claim 2, wherein data from multiple drivers and multiple road segments is utilized to determine the classification of the current driver behavior and the classification of the upcoming road segment, and wherein the estimated potential regenerative braking energy along the upcoming road segment is based on applying a nearest neighbor algorithm to the data.

4. The vehicle of claim 1, wherein the classification of the current driver behavior is selected from one of multiple driver classifications that were established based on an application of a k-means clustering algorithm to driver behavior data from multiple drivers.

5. The vehicle of claim 4, wherein a neural network is trained to the multiple classifications of drivers, and wherein the classification of the current driver behavior is selected from one of the multiple driver classifications based on application of the neural network to characteristics of the current driver behavior.

6. The vehicle of claim 1, wherein a neural network is trained to the multiple road segment classifications, and wherein the classification of the upcoming road segment is selected from one of the multiple road segment classifications based on application of the neural network to characteristics of the upcoming road segment.

7. A vehicle battery recharging method:
collecting driver behavior and road segment characteristic data from multiple drivers over multiple segments;
establishing a current driver behavior classification based on the driver behavior data, wherein the current driver behavior classification is selected from one of multiple driver classifications that were established based on an application of a k-means clustering algorithm to the driver behavior data from multiple drivers;
establishing an upcoming road segment classification based on the road segment characteristic data;
identifying a regenerative braking opportunity along the upcoming road segment by cross-referencing the driver behavior classification to the upcoming road segment classification; and
recharging the battery via regenerative braking along the upcoming road segment.

8. The method of claim 7 further comprising:
in response to a battery charge capacity being less than a value required to recoup an estimated potential regenerative braking energy along the upcoming road segment, operating an electric machine to increase the battery charge capacity to greater than the value prior to the vehicle reaching the upcoming road segment.

9. The method of claim 8, wherein the estimated potential regenerative braking energy along the upcoming road segment is based on applying a nearest neighbor algorithm to the data.

10. The method of claim 7, wherein a neural network is trained to the multiple classifications of drivers, and wherein the current driver behavior classification is selected from one of the multiple driver classifications based on application of the neural network to characteristics of the current driver behavior.

11. The method of claim 7, wherein the upcoming road segment classification is selected from one of multiple road segment classifications that were established based on an application of a k-means clustering algorithm to the road segment characteristic data from multiple road segments.

12. The method of claim 11, wherein a neural network is trained to the multiple road segment classifications, and wherein the classification of the upcoming road segment is selected from one of the multiple road segment classifications based on application of the neural network to characteristics of the upcoming road segment.

13. A vehicle comprising:
an electric machine configured to draw energy from a battery to propel the vehicle and to recharge the battery during regenerative braking; and
a controller programmed to,
in response to identifying a regenerative braking opportunity along an upcoming road segment based on classifications of current driver behavior and the upcoming road segment, schedule a regenerative braking event along the upcoming road segment, wherein data from multiple drivers and multiple road segments is utilized to determine the classifications of the current driver behavior and the upcoming road segment, and
in response to a battery charge capacity being less than a value required to recoup an estimated potential regenerative braking energy during the scheduled regenerative braking event, operate the electric machine to increase the battery charge capacity to greater than the value prior to the scheduled regenerative braking event, wherein the estimated potential regenerative braking energy during the scheduled regenerative braking event is based on applying a nearest neighbor algorithm to the data.

14. The vehicle of claim 13, wherein the classification of the current driver behavior is selected from one of multiple driver classifications that were established based on an application of a k-means clustering algorithm to driver behavior data from multiple drivers.

15. The vehicle of claim 14, wherein a neural network is trained to the multiple classifications of drivers, and wherein the classification of the current driver behavior is selected from one of the multiple driver classifications based on application of the neural network to characteristics of the current driver behavior.

16. The vehicle of claim 13, wherein the classification of the upcoming road segment is selected from one of multiple road segment classifications that were established based on an application of a k-means clustering algorithm to road segment characteristic data from multiple road segments.

17. The vehicle of claim 16, wherein a neural network is trained to the multiple road segment classifications, and wherein the classification of the upcoming road segment is selected from one of the multiple road segment classifications based on application of the neural network to characteristics of the upcoming road segment.

* * * * *